US008079036B2

(12) United States Patent
Callender

(10) Patent No.: US 8,079,036 B2
(45) Date of Patent: *Dec. 13, 2011

(54) METHOD AND SYSTEM FOR STRUCTURED DMA TRANSACTIONS

(75) Inventor: Robin L. Callender, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1661 days.

This patent is subject to a terminal disclaimer.

(21) Appl. No.: 10/985,143

(22) Filed: Nov. 10, 2004

(65) Prior Publication Data

US 2006/0101166 A1 May 11, 2006

(51) Int. Cl.
G06F 3/00 (2006.01)
G06F 13/28 (2006.01)
G06F 13/36 (2006.01)

(52) U.S. Cl. .......................... 719/310; 710/22; 710/308
(58) Field of Classification Search .................. 719/328, 719/310, 308; 710/22, 308
See application file for complete search history.

(56) References Cited

U.S. PATENT DOCUMENTS

| 4,847,750 | A | * | 7/1989 | Daniel ............................ 710/26 |
| 5,276,684 | A | | 1/1994 | Pearson |
| 5,404,522 | A | * | 4/1995 | Carmon et al. ............... 718/107 |
| 5,590,313 | A | | 12/1996 | Reynolds et al. |
| 5,623,692 | A | * | 4/1997 | Priem et al. ....................... 710/3 |
| 5,903,771 | A | * | 5/1999 | Sgro et al. ....................... 712/20 |
| 5,918,070 | A | * | 6/1999 | Moon et al. ..................... 710/22 |
| 6,052,744 | A | * | 4/2000 | Moriarty et al. ............... 710/27 |
| 6,081,851 | A | * | 6/2000 | Futral et al. .................... 710/23 |
| 6,128,674 | A | | 10/2000 | Beukema et al. |
| 6,341,318 | B1 | * | 1/2002 | Dakhil ............................. 710/23 |
| 6,732,060 | B1 | | 5/2004 | Lee |
| 6,735,773 | B1 | * | 5/2004 | Trinh et al. .................... 719/328 |
| 2001/0041972 | A1 | | 11/2001 | Dearth et al. |
| 2002/0069245 | A1 | | 6/2002 | Kim |
| 2002/0103822 | A1 | | 8/2002 | Miller |
| 2003/0188126 | A1 | * | 10/2003 | Sudo ................................. 712/1 |
| 2005/0050241 | A1 | | 3/2005 | Furuta et al. |
| 2005/0157725 | A1 | * | 7/2005 | Pettey ........................... 370/392 |

OTHER PUBLICATIONS

Nathan L. Binkert, Network-Oriented Full-System Simulation Using M5, Feb. 2003.*

* cited by examiner

*Primary Examiner* — Lechi Truong
(74) *Attorney, Agent, or Firm* — Capitol City TechLaw; Richard C. Irving

(57) ABSTRACT

Disclosed is a structured model for developing DMA code and for performing DMA transactions. This model of structured DMA transactions provides a framework with default behaviors. Developers need only provide a minimal amount of configuration information and can then characterize subsequent DMA transactions in terms of a profile, thus reducing the amount of detailed and often redundant information that developers need to provide for each DMA transaction. In some embodiments, the DMA transaction model is expressed in terms of object-oriented programming constructs. In one example, a DMA enabler object captures general DMA operational parameters and manages underlying operating system objects and behavior. When device manager software receives an input/output request that involves a DMA data transfer, the device manager constructs a DMA transaction object that represents the DMA work request. During the processing of the DMA transaction, the DMA transaction object maintains state and status information.

28 Claims, 10 Drawing Sheets

METHOD AND SYSTEM FOR STRUCTURED DMA TRANSACTIONS

CROSS-REFERENCE TO RELATED APPLICATION

The present application is related to U.S. patent application Ser. No. 10/985,174, entitled "Method and System for Structured Programmed Input/Output Transactions", filed on Nov. 10, 2004.

TECHNICAL FIELD

The present invention is related generally to direct memory access (DMA) transactions in computing systems, and, more particularly, to structured DMA transactions.

BACKGROUND OF THE INVENTION

DMA is a set of techniques for moving data from one area of memory in a computing device to another area. DMA transactions are very efficient because, once a DMA transfer operation is configured, it does not further involve the central processing unit (CPU) of the computing device, allowing the CPU to do other work while the DMA transaction proceeds. DMA transactions have thus become common and often essential features of modern computing devices.

Because DMA transactions proceed asynchronously with respect to a device's CPU, and because more than one of these asynchronous transactions may be in process at the same time, coordinating DMA transactions is quite complicated and often confusing. Some confusion arises because different operating systems impose different requirements on software developers who write code for DMA transactions. These developers may have only incomplete knowledge of the DMA requirements and capabilities of a device. Also, the developers may have neither the time nor the inclination to master all of the details of a given device's DMA transactions. In consequence, each developer tries to use only as much of a device's DMA capabilities as is strictly necessary for his tasks. Code supporting DMA transactions is thus implemented in an ad hoc fashion which invites errors and inefficiencies and which does not provide a stable basis for future development.

The resulting situation is that DMA transactions often run at a level of efficiency lower than would otherwise be possible, and ill formed DMA transactions can slow down or even jeopardize the stability of computing systems.

SUMMARY OF THE INVENTION

In view of the foregoing, the present invention provides a structured model for developing DMA code and for performing DMA transactions. This model of structured DMA transactions lessens the burdens on DMA software developers by providing a framework with default behaviors. Developers need only provide a minimal amount of configuration information and can then characterize subsequent DMA transactions in terms of a profile, thus reducing the amount of detailed and often redundant information that developers need to provide for each DMA transaction. If necessary, the developer can choose to override the profile for a specific DMA transaction.

In some embodiments, the DMA transaction model is expressed in terms of object-oriented programming constructs. In one example, the DMA transaction model is based on a DMA enabler object and on a DMA transaction object.

The DMA enabler object captures general DMA operational parameters and manages underlying operating system objects and behavior. The DMA enabler object hides details of these operating system objects from the developer; the operating system's specific needs are addressed through methods of the DMA enabler object. The DMA enabler object also holds default values for subsequent DMA transaction objects created to conduct DMA transactions.

When device manager software (e.g., a device driver) receives an input/output request that involves a DMA data transfer, the device-manager constructs a DMA transaction object that represents the DMA work request. The DMA transaction object references the DMA enabler object for default information. During the processing of the DMA transaction, the DMA transaction object maintains state and status information.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
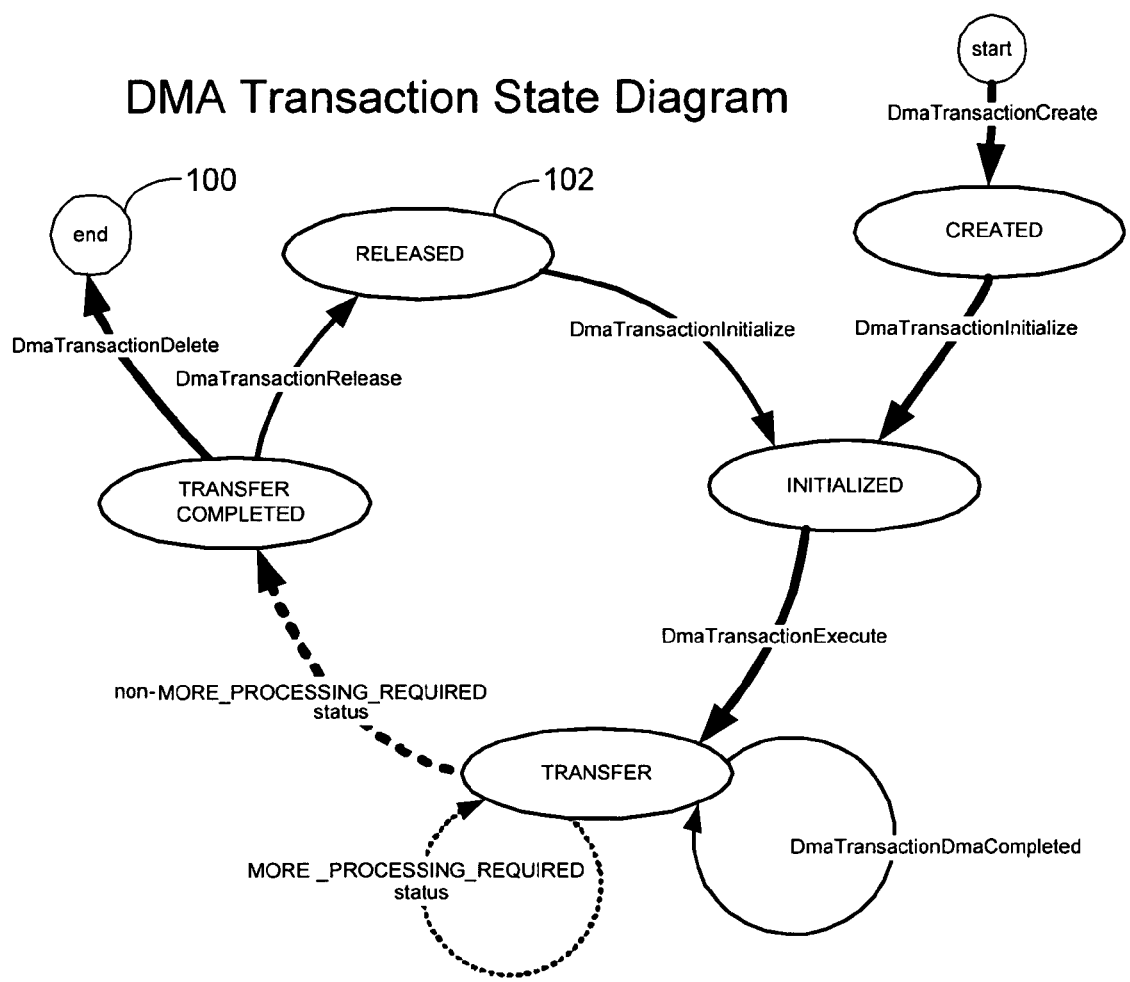
FIG. 1 is a state-transition diagram for an exemplary DMA transaction model.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the environment surrounding the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The exemplary embodiment of the present invention portrayed in the accompanying Figures models the structure of DMA transactions using a DMA enabler object and a DMA transaction object.

The DMA enabler object captures general DMA operational parameters and manages any underlying operating system objects. These operating system objects are hidden from software developers and are manipulated only through the methods of the DMA enabler. By so doing, the DMA enabler provides a consistent set of interfaces to different types of DMA operations. Developers of device manager software simply declare the intended form of DMA operations used within their device managers and then initiate efficient DMA-based transfers in a structured, transaction-oriented way. In various embodiments, the DMA enabler object supports the following features:

- a transaction-based program model for DMA transactions;
- extension of input/output request processing into the DMA domain;
- management of mixed-mode DMA addressing (e.g., a 32-bit DMA engine on a 64-bit platform);
- management of scatter/gather lists;
- full-duplex DMA operations: to-device DMA transfers operate independently of from-device DMA transfers;
- management of map registers; and
- MDL (NDIS_BUFFER) chains such as NDIS (Network Driver Interface Specification) drivers might expect.

A developer chooses which DMA enabler "profile" to use. For example, one embodiment enumerates a set of supported profiles correlated to most PCI devices supporting DMA operations. A possible enumeration of profiles is as follows:

```
typedef enum _DMA_PROFILE
{
    DmaProfilePacket32 = 0,
    DmaProfileScatterGather32,
    DmaProfilePacket64,
    DmaProfileScatterGather64,
    DmaProfileScatterGather32Duplex,
    DmaProfileScatterGather64Duplex,
} DMA_PROFILE;
```

For example, if a device supports scatter/gather DMA operations and has separate to-device and from-device DMA engines (e.g., it supports duplex operations) but only supports 32-bit addressing, then the developer could choose the profile DmaProfileScatterGather32Duplex when creating a new DMA enabler object.

The DMA enabler object is the container for a system's DMA adapter object. In general, any facilities which are supported by the DMA adapter are also supported by the DMA enabler. These facilities often include support for DMA operations (building scatter/gather or packet descriptors and mapping register allocation) and allocation of the Common Buffer.

The DMA enabler object is normally created during the StartDevice sequence. The developer may wish to consider the following factors during creation:

(a) The DeviceObject's Alignment Requirements value should reflect the alignment requirements of the device manager. This value is set in the DeviceObject prior to creating the DMA enabler object. Changes to the DeviceObject's Alignment Requirement value after creating the DMA enabler object have no effect on the new DMA enabler.

(b) The MaximumLength parameter of the DmaEnablerCreate function (used to create the DMA enabler object) usually represents the maximum transfer length allowable by a device manager. (An exception is for device managers that participate in NDIS driver configuration. See below.) This is the length of DMA transfers that are staged to the hardware. If a transfer is greater than MaximumLength, then the transfer is processed in multiple DMA transfers where each transfer is of MaximumLength or less.

(c) The device which the device manager controls may have additional hardware limitations as to the maximum number of scatter/gather elements it can handle in a single DMA transfer. If necessary, the DmaEnablerSetMaximumScatterGatherElements function is called to set the MaximumScatterGatherElements value. If used, this function should be called after the call to DmaEnablerCreate and before StartDevice finishes. If this value is not specified, then a default value is used which effectively disables any DMA enabler-based detection of a too fragmented data transfer.

Drivers that interface to NDIS's lower edge need to define their MaximumLength to accommodate the larger number of small MDLs which are usually passed down by NDIS. The typical NDIS_PACKET has five or six MDLs where each MDL contains a few tens of bytes of data. As an example, assume that a driver has a MaximumScatterGatherElements limit of 8 (HARDWARE_MAX_FRAG_COUNT). Then the formula for calculating the MaximumLength parameter for DmaEnablerCreate is:

$$\text{MaximumLength} = \text{PAGE\_SIZE} * \text{HARDWARE\_MAX\_FRAG\_COUNT}$$

In a typical embodiment, only one DMA enabler object is created per device. However, a new DMA transaction object is created whenever a device manager receives an input/output request which involves a data transfer via DMA. The DMA transaction object references the DMA enabler object as part of its construction (so the DMA enabler object should be created first), and the DMA transaction object uses as defaults the value in the DMA enabler. During processing, the DMA transaction object represents the DMA transfer request, maintaining full state information.

For an exemplary DMA transaction object, FIG. 1 presents a state diagram and the APIs used to induce state transitions. In this example, there are two life cycle possibilities for the DMA transaction object. In the first possibility, the DMA transaction is deleted (100) when the DMA transfer is completed. In the second possibility, the DMA transaction object is pre-allocated once and then reused (102) for multiple DMA transfers.

The remainder of this specification provides details of embodiments of the DMA transaction object portrayed in FIG. 1.

Figure 2:
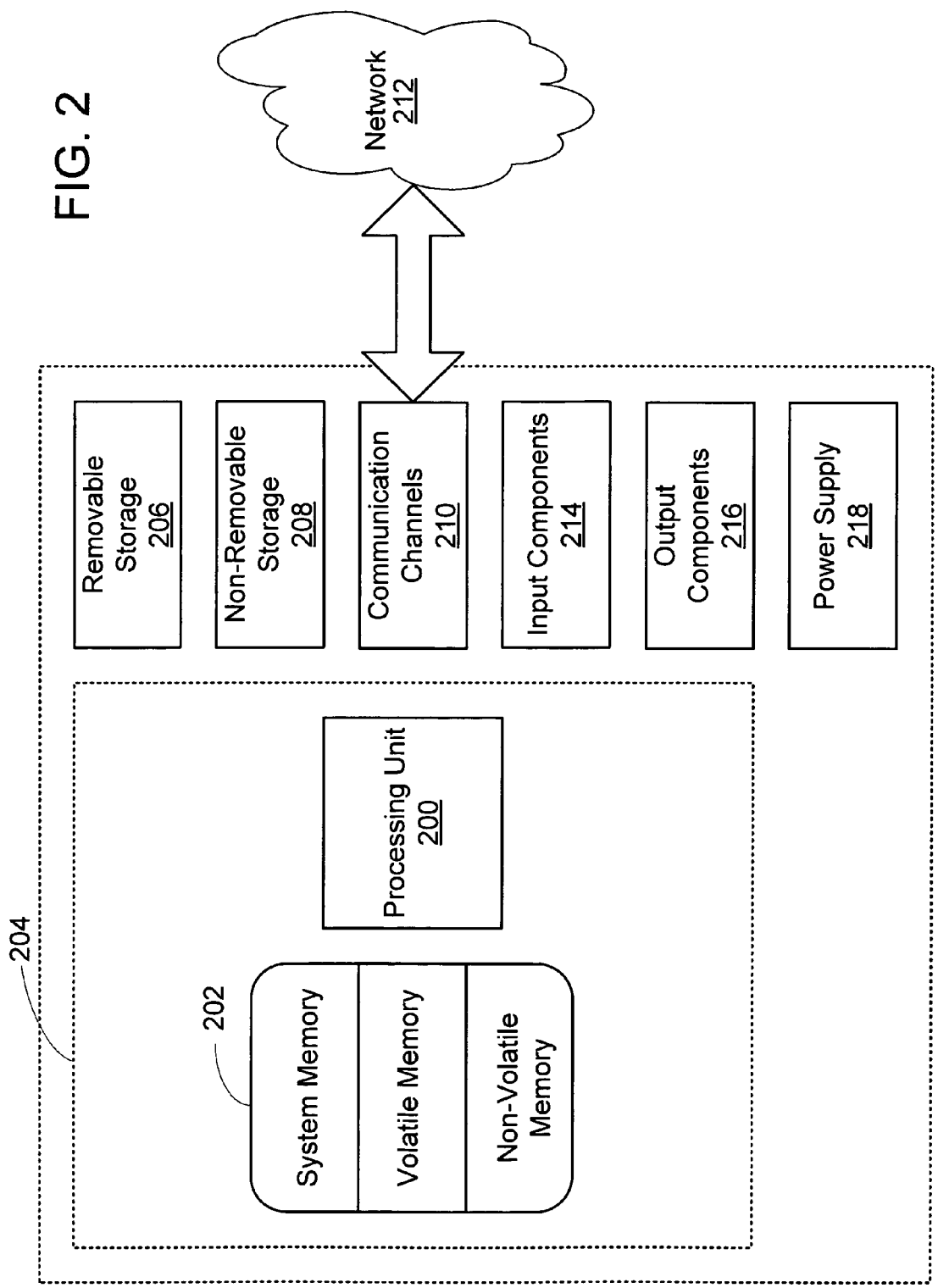
FIG. 2 is a schematic diagram generally illustrating an exemplary computing device that supports the present invention.

Although many of the examples given in this specification are derived from implementations on Microsoft "WINDOWS" operating systems, the present invention may in fact be implemented on computing systems of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In their most basic configurations, the computing system typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing system may have additional features and functionality. For example, it may include additional storage (removable and non-removable) including, but not limited to, magnetic and optical disks and tape. Such additional storage is illustrated in FIG. 2 by removable storage 206 and by non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system. Any such computer-storage media may be part of the computing system. The computing system may also contain communications channels 210 that allow it to communicate with other devices, including devices on a network 212. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The computing system may also have input devices 214 such as a touch-sensitive display screen, a hardware keyboard, a mouse, a voice-input device, etc. Output devices 216 include the devices themselves, such as the touch-sensitive display screen, speakers, and a printer, and rendering modules (often called "adapters") for driving these devices. All these devices are well know in the art and need not be discussed at length here. The computing system has a power supply 218.

Figure 3:
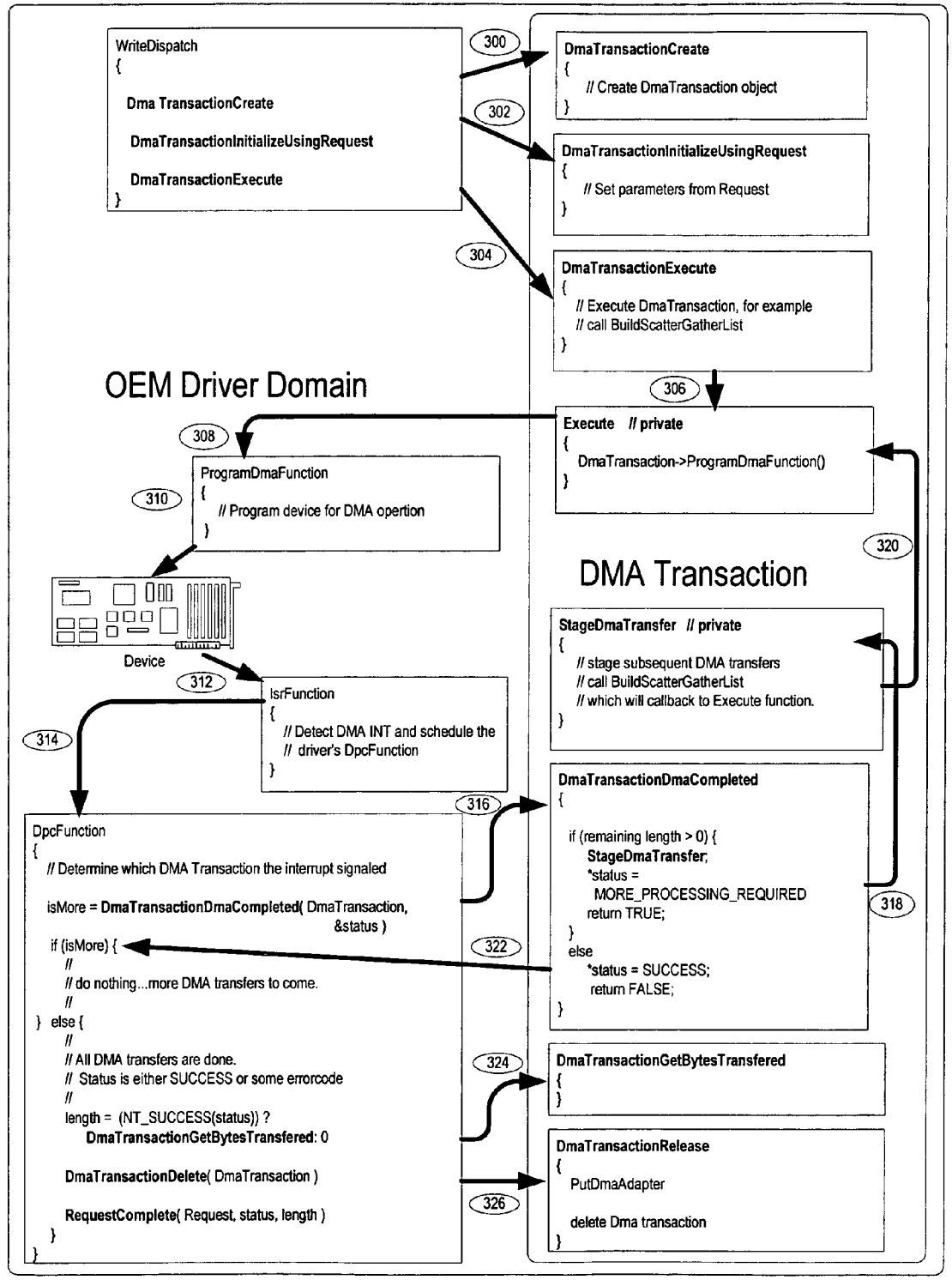
FIG. 3 is an execution workflow diagram for a DMA transaction.

FIG. 3 presents details of how an exemplary DMA transaction object progresses through the state machine of FIG. 1 during the processing of a DMA work request.

Step 300: In response to receiving a new Write Request on its input/output queue, the Write Dispatch routine calls DmaTransactionCreate to instantiate a new DMA transaction object. A handle to the new object is returned.

Step 302: The Write Dispatch routine calls DmaTransactionInitialize to set the initial parameters of the DMA transaction object. Note that other methods may be derived from DmaTransactionInitialize to initialize a DMA transaction object from special environments or from other non-DMA transaction objects.

Step 304: DmaTransactionExecute begins the initial DMA transfer. For example, when operating in scatter/gather DMA mode (as in the remainder of the example of FIG. 3), the kernel service BuildScatterGatherList is called with a DMA transaction-private function given as the "Execute Function" callback parameter. Note that DmaTransactionExecute is only used to begin the first DMA transfer. Subsequent DMA transfers are driven from DmaTransactionDmaCompleted as described below (step 318).

Step 306: The DMA transaction-private function (Execute) stages the callback into the device manager's PFN_PROGRAM_DMA function, ProgramDmaFunction.

The PFN_PROGRAM_DMA callback function programs a DMA transfer. This callback should be as focused as possible on programming the device to effect the DMA transfer, without mixing in other device manager operations unless absolutely necessary. The parameters passed to this callback are, respectively, a context, whether the DMA transfer is to or from the device, and a pointer to a scatter/gather list. If the DMA enabler object was created with a profile supporting scatter/gather operations, then the scatter/gather list may contain one or more SCATTER_GATHER_ELEMENTS. Otherwise, the scatter/gather list contains a single element.

```
Typedef BOOLEAN (*PFN_PROGRAM_DMA)
(
    IN DEVICE                  Device,
    IN PVOID                   Context,
    IN DMA_DIRECTION           Direction,
    IN PSCATTER_GATHER_LIST    SgList
);
```

The PFN_PROGRAM_DMA callback is called at IRQL level DISPATCH.

If for some reason, the PFN_PROGRAM_DMA callback cannot initiate the DMA transfer, then the DMA transaction should be aborted. When necessary, this should be done as soon as possible, to allow the scare resources consumed by the DMA transaction (map registers in particular) to be made available to others.

Step 308: ProgramDmaFunction's input is a kernel-provided scatter/gather list. This method translates this list into a device-dependent scatter/gather list and programs the device registers to start the DMA transfer.

Step 310: When the device completes the DMA transfer operation, it sets its Command/Status Register (CSR) and generates an interrupt.

Step 312: The device manager's ISR (Interrupt Service Routine), IsrFunction, detects that the interrupt is signaling the completion of a DMA transfer operation and schedules the device manager's DPC (Deferred Procedure Call) routine.

Step 314: The device manager's DPC routine, DpcFunction, determines which DMA transaction is indicated by the interrupt (there could be several concurrent DMA operations) and retrieves the associated DMA transaction object handle.

Step 316: With the DMA transaction object handle, DmaTransactionDmaCompleted is called to indicate to the DMA transaction object that this DMA transfer has completed. This method call allows the DMA transaction object to continue processing the DMA transaction.

Step 318: If DmaTransactionDmaCompleted determines that more DMA transfers should be staged, then it calls a DMA transaction-private function, StageDmaTransfer, to begin the next DMA operation. StageDmaTransfer calls the kernel-service BuildScatterGatherList again but with parameters set to transfer the next section of data.

Step 320: The Execute function, common to step 306, forms the top of the DMA transfer loop (steps 306 through 320) which continues until all of the data identified in the DMA transaction have been transferred.

Step 322: The DmaTransactionDmaCompleted method returns an indication as to whether all of the DMA transfers have been completed. When more DMA transfer operations are needed, then a TRUE value is returned, and status is set to MORE_PROCESSING_REQUIRED. When a FALSE value is returned (and a non-MORE_PROCESSING_REQUIRED status is set), then the DMA transaction has transitioned from the TRANSFER state to the TRANSFER_COMPLETED state. The DpcFunction routine begins the post-transfer phase of the DMA transaction.

Step 324: A call to the DmaTransactionGetBytesTransferred method of the DMA transaction object gets the final DMA transfer byte count to be used for completing the Write Request.

Step 326: In the example of FIG. 3, the DMA transaction object is destroyed by calling DmaTransactionDelete. (See step 100 of FIG. 1.)

Figure 4:
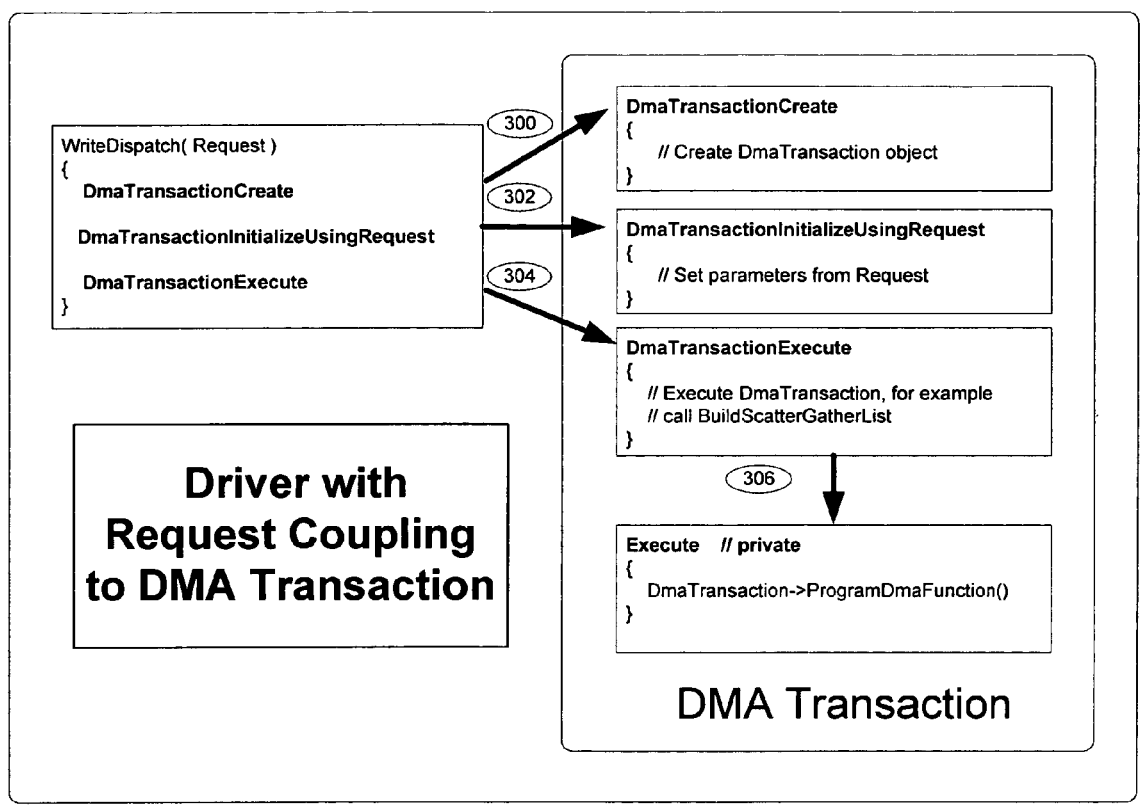
FIG. 4 is an execution workflow diagram for initiating a DMA transaction.

FIGS. 4 through 10 present variations on the basic scheme portrayed in FIGS. 1 and 3. In FIG. 4, a DMA transaction is initiated. The working environment is the device manager's Read- or Write-Request dispatch function where a REQUEST handle, representing the Request, is passed as a parameter.

Step 300: DmaTransactionCreate creates an empty DMA transaction object.

Step 302: DmaTransactionInitializeUsingRequest initializes the DMA transaction. The operating parameters for the DMA transaction are captured by querying the Request and its underlying IRP (Input/output Request Packet).

Step 304: DmaTransactionExecute validates the DMA transaction (e.g., has it been successfully initialized?) and then calls BuildScatterGatherList.

Step 306: From this point on, the processing is the same as described in FIG. 3.

Figure 5:
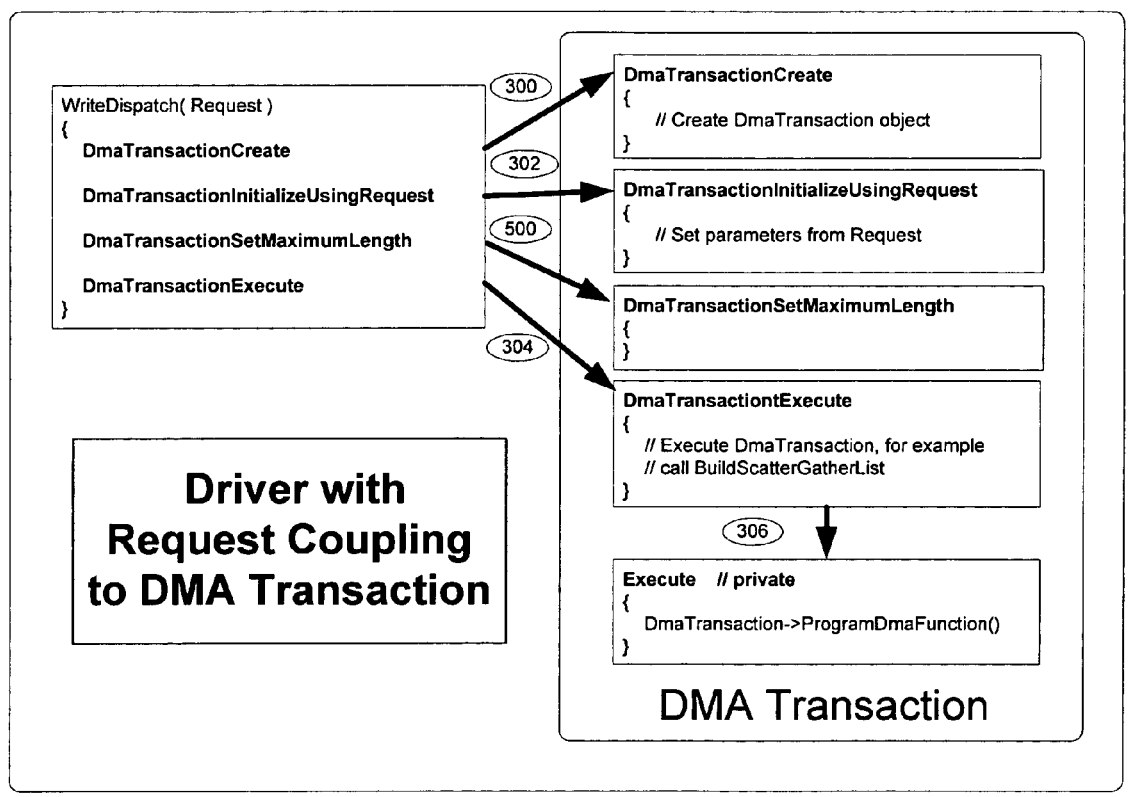
FIG. 5 is a variation on FIG. 4 that specifies a non-standard maximum length for the DMA transaction.

FIG. 5 shows a variation on FIG. 4 in which the DMA transaction object is updated to operate with a MaximumLength other than the default set when the DMA enabler object was created. The MaximumLength value controls the maximum byte count per DMA transfer for this DMA transaction. The new MaximumLength is less than or equal to the DMA enabler's MaximumLength.

Steps 300 and 302: Same as for FIG. 4.

Step 500: DmaTransactionSetMaximumLength sets the MaximumLength for this particular DMA request.

Step 304: From this point on, the processing is the same as described in FIG. 3.

Figure 6:
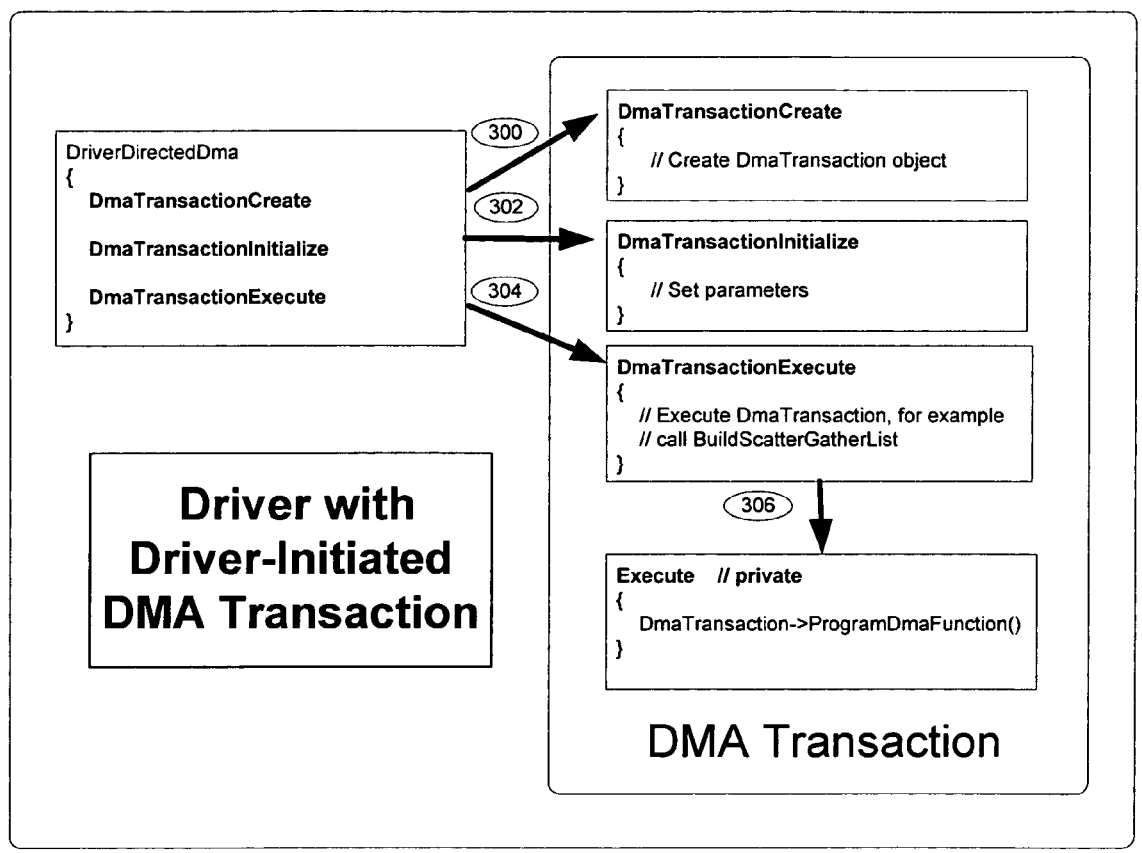
FIG. 6 is an execution workflow diagram for a device manager-initiated DMA transaction.

FIG. 6 illustrates how a device manager itself can initiate a DMA transaction without the transaction being coupled with a Request or with an external IRP. This is also useful where finer control over the DMA transaction parameters is needed, such as when manipulating the starting Virtual Address or Length.

Step 300: DmaTransactionCreate creates an empty DMA transaction object.

Step 302: DmaTransactionInitialize initializes the DMA transaction. The operating parameters for the DMA transaction are passed as parameters, rather than being taken from a Request.

Step 304: From this point on, the processing is the same as described in FIG. 3.

Figure 7:
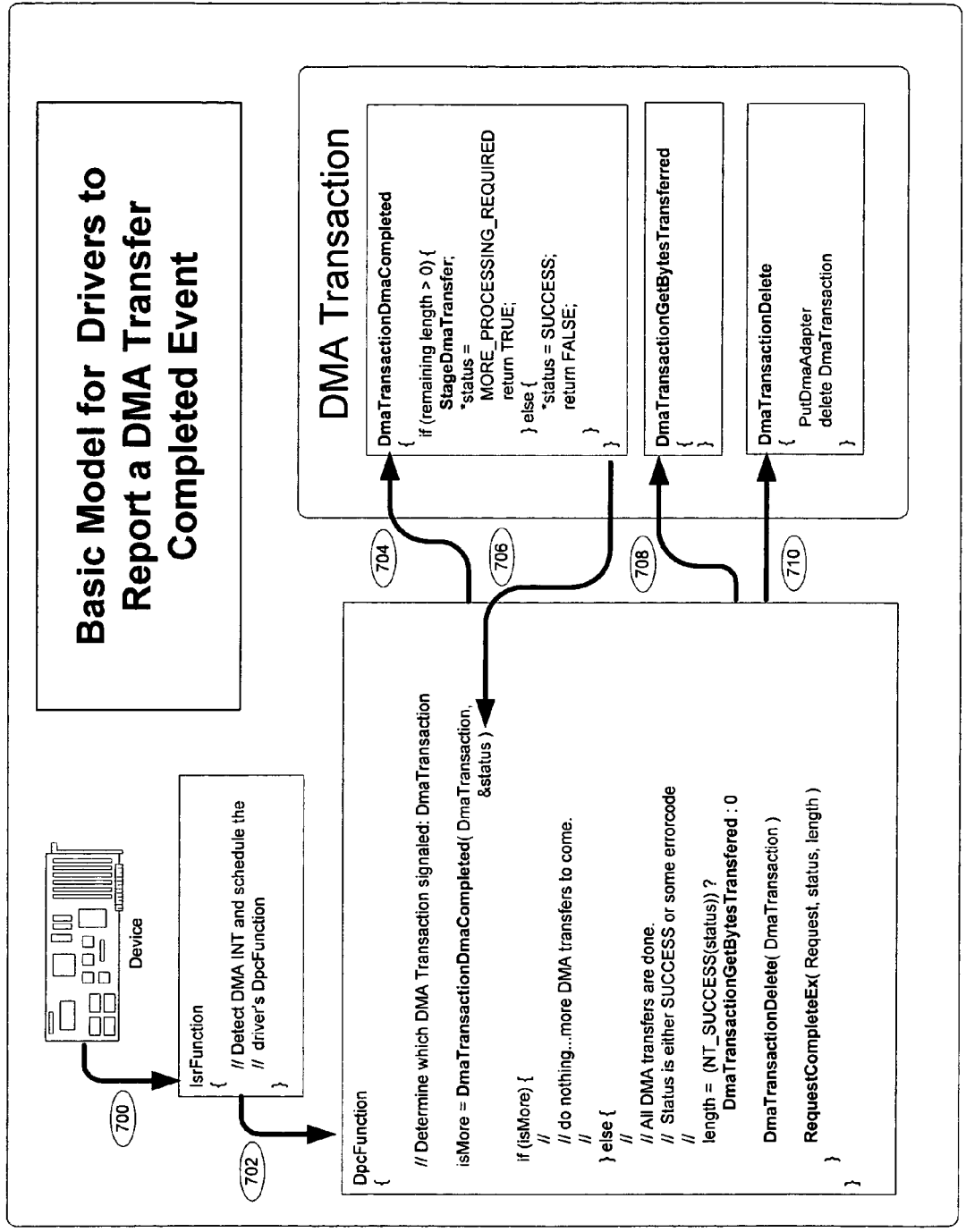
FIG. 7 is an execution workflow diagram for the completion of a DMA transaction.

FIG. 7 shows how a device manager notifies the DMA transaction object of a just completed DMA transfer. This diagram is a subsection of FIG. 2. In the example of FIG. 7, it is assumed the device hardware does not report the length (byte count) of the DMA transfer. The DMA transaction object assumes that the transferred length is the length passed to the device manager's PFN_PROGRAM_DMA callback function.

Step 700: The device generates an interrupt to signal the completion of a DMA transfer.

Step 702: The device manager's ISR function determines that it owns the interrupt and then schedules the DPC function.

Step 704: The device manager's DPC function determines which DMA transaction matches the just completed DMA transfer. It then calls DmaTransactionDmaCompleted to communicate this event to the DMA transaction object.

Step 706: In response, the DMA transaction object determines whether (a) more processing is needed for this DMA transaction or (b) the DMA transaction has transferred all the data. DmaTransactionDmaCompleted returns TRUE if the DMA transaction transitioned from the TRANSFER state to the TRANSFER_COMPLETED state. (See FIG. 1.) FALSE means that more DMA transfers are needed to complete the DMA transaction. The DMA transaction states are also indicated by the returned status: MORE_PROCESSING_REQUIRED means there has been no state change (TRANSFER state), while a non-MORE_PROCESSING_REQUIRED means that there has been a transition to the TRANSFER_COMPLETED state.

Step 708: In response to a completion indicator, the device manager gets the final transfer length from the DMA transaction.

Step 710: The DMA transaction is deleted. This flushes the underlying map registers and caches. If the DMA transaction was initialized via DmaTransactionInitializeUsingRequest, then the reference on the Request is dropped.

Figure 8:
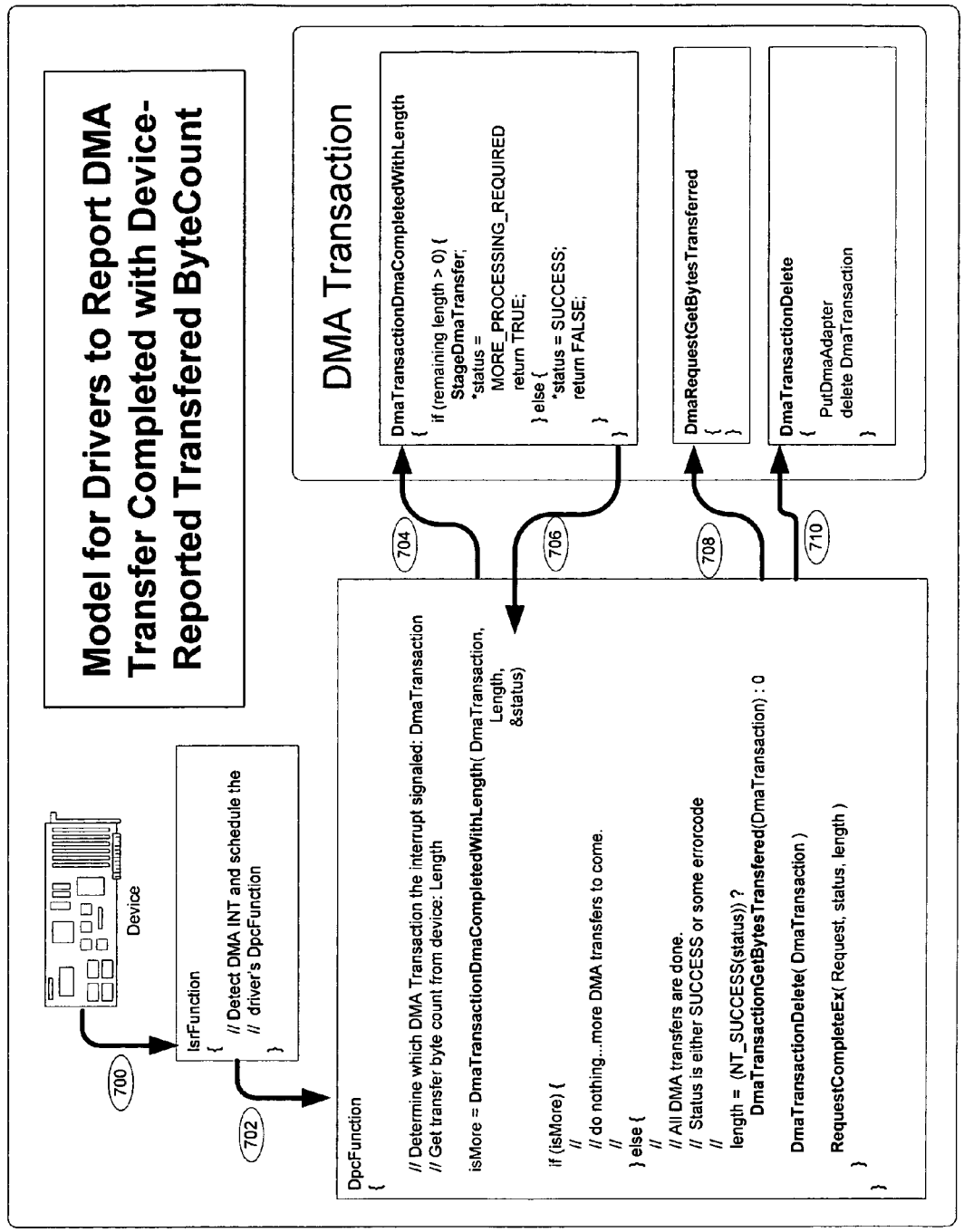
FIG. 8 is a variation on FIG. 7 that specifies the number of bytes actually transferred in the DMA transaction.

FIG. 8 is a variation on FIG. 7 where the device provides the actual number of bytes transferred in the DMA transaction.

Steps 700 and 702: Same as for FIG. 7.

Step 704: The device manager's DPC function determine which DMA transaction matches the just completed DMA transfer. The device manager queries the device for the transferred length and then calls DmaTransactionDmaCompletedWithLength to communicate this event to the DMA transaction object.

Step 706: In response, the DMA transaction object uses the transferred length to determine whether more processing is needed for this DMA transaction.

Step 708: If the DMA transfer is complete, then the device manager gets the final transfer length from the DMA transaction object.

Step 710: Same as for FIG. 7.

Figure 9:
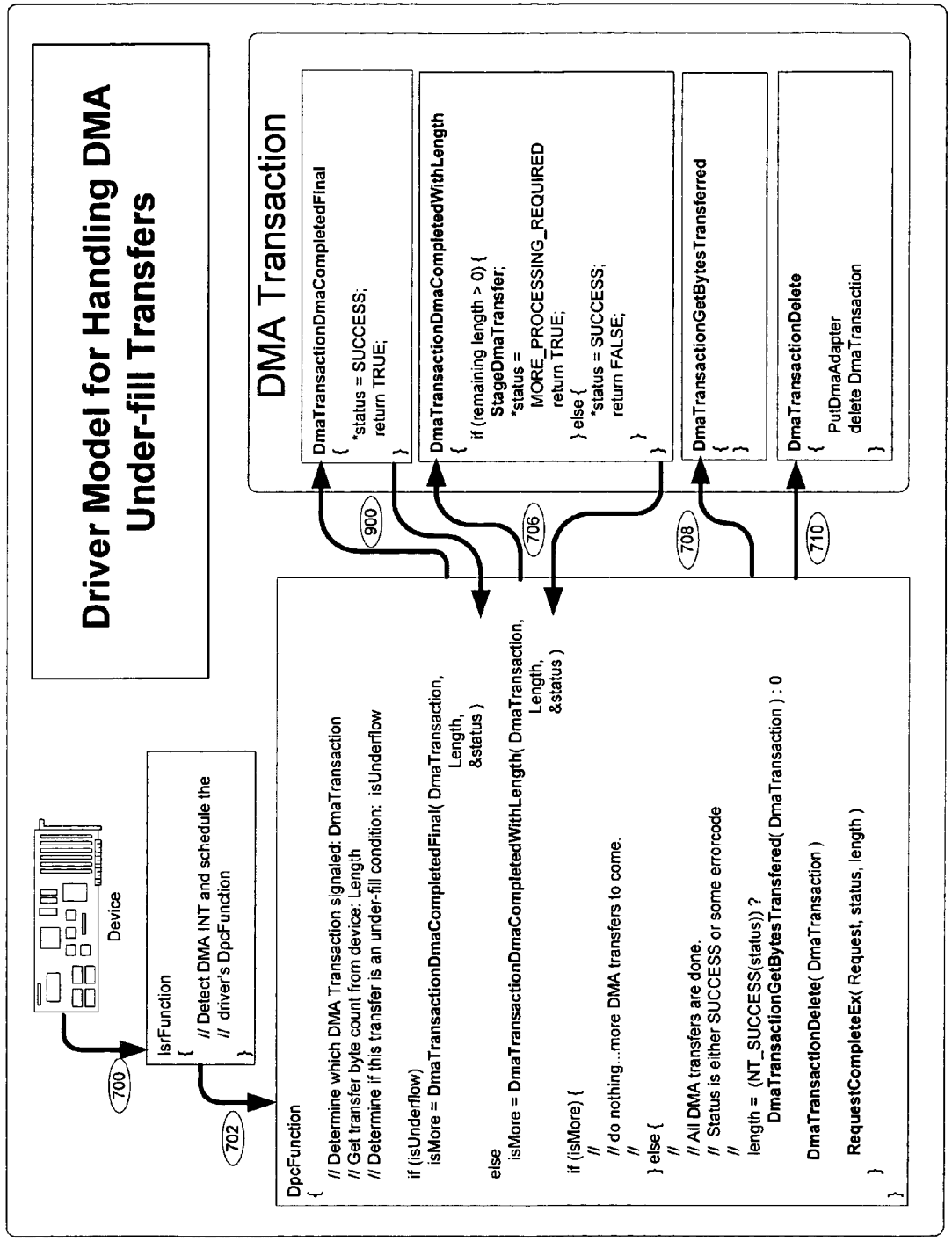
FIG. 9 is a variation on FIG. 8 with a DMA under-fill condition.

FIG. 9 is a variation on FIG. 8 in which the device manager detects a DMA under-fill condition and notifies the DMA transaction object of this terminal event. All other aspects of this scenario are as shown in FIG. 8.

Steps 700 and 702: Same as for FIG. 7.

Step 900: The device manager determines that the device reported the DMA transferred length as a final length. To report this terminal event, the device manager calls. DmaTransactionDmaCompletedFinal.

Step 706: In response, the DMA transaction object uses the transferred length to determine whether more processing is needed for this DMA transaction. In this case, the DMA transaction object returns FALSE and a non-MORE_PROCESSING_REQUIRED status, thus indicating that the device manager should perform post-transfer processing for this DMA Request.

Step 708: In response to the non-MORE_PROCESSING_REQUIRED status, the device manager gets the final transfer length from the DMA transaction object. The transferred length-value includes the final transferred length.

Step 710: Same as for FIG. 7.

Figure 10:
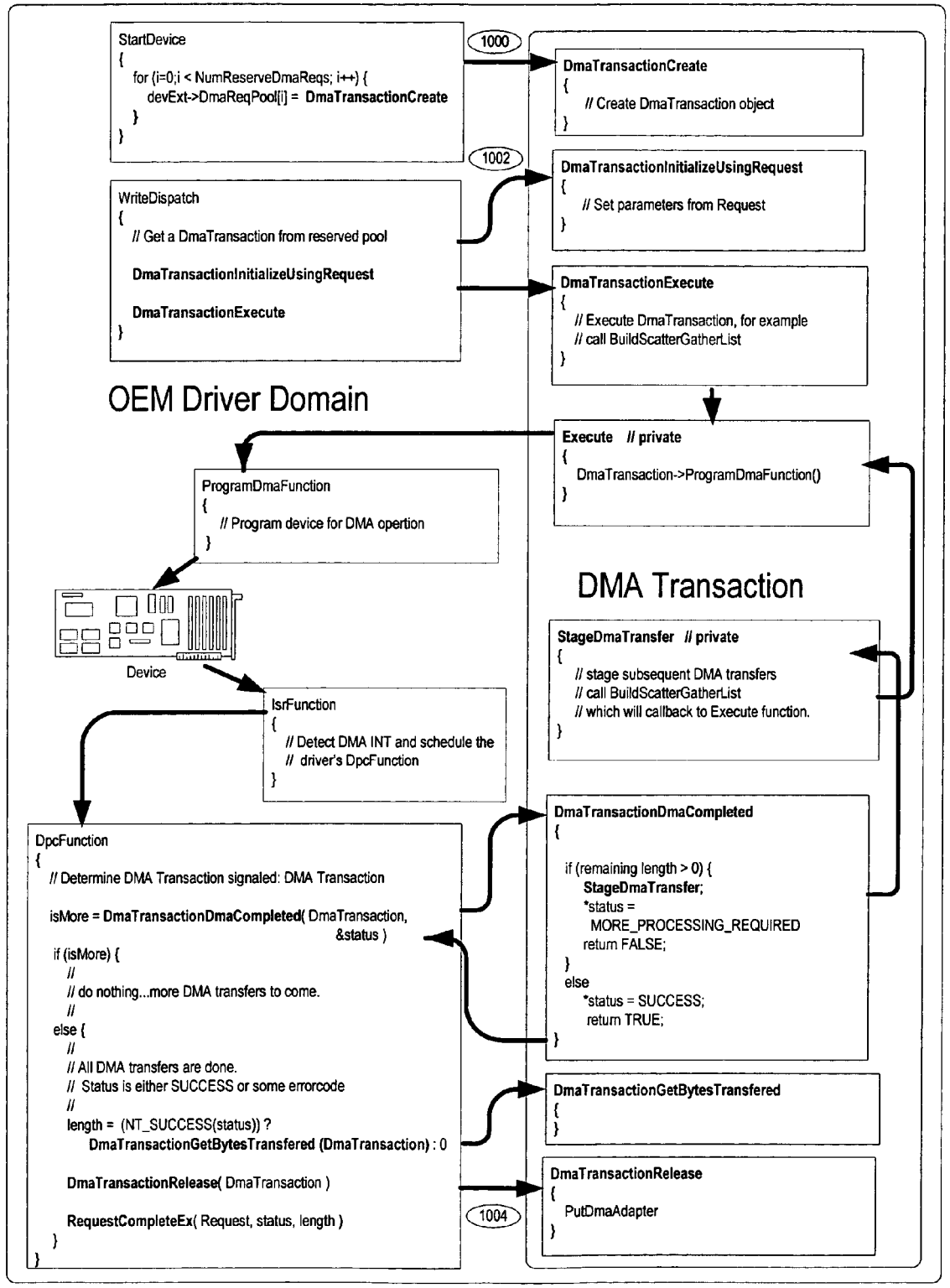
FIG. 10 is an execution workflow diagram for a DMA transaction when resources (e.g., memory) are low.

FIG. 10 presents a method for handling low-resource conditions. These conditions are usually experienced as the inability of a device manager to dynamically acquire memory, especially at a critical juncture such as paging. The method of FIG. 10 allows the device manager to continue to make "forward progress" under low-resource conditions. "Reserved" DMA transaction objects may be allocated when resources are not scarce, usually during device manager initialization. Later, when a low-resource condition arises, the "reserved" DMA transactions are brought out of reserve and initialized.

Step 1000: During AddDevice or StartDevice, one or more DMA transaction objects are created and designated as "reserved."

Step 1002: When a low-resource condition occurs, the device manager pulls a DMA transaction object from its reserve pool and initializes it. The initialization function, DmaTransactionInitialize[UsingRequest], reinitializes the DMA transaction to a reset state prior to capturing the operating parameters.

Step 1004: After processing, the DMA transaction is released by calling DmaTransactionRelease. This function causes the DMA transaction to flush any buffers. In contrast to ObjectDelete, the DMA transaction may be placed back in the reserve pool for later reuse.

(Not shown in FIG. 10) Eventually, the reserved DMA transaction objects in the pool are freed by calling ObjectDelete. DmaEnablerDelete checks to insure that no DMA transactions are still associated with the DMA enabler.

The following is an exemplary implementation of the functionality described above in relation to FIGS. 1 through 10. This implementation is meant purely as a teaching aid illustrating some concepts of the present invention and is not meant to limit the scope of that invention in any way.

DmaEnablerCreate

```
STATUS
DmaEnablerCreate
(
    IN DEVICE              Device,
    IN DMA_OBJECT_CONFIG   * DmaConfig,
    IN OBJECT_ATTRIBUTES   * Attributes OPTIONAL,
    OUT DMAENABLER         * DmaEnabler
);
```

DmaEnablerCreate creates a DMA enabler instance from which to stage subsequent DMA operations and returns a DMAENABLER handle.

Parameters:
Device
Specifies the DEVICE handle to be associated with the DMA enabler.

DmaConfig
Specifies a pointer to a DMA_ENABLER_CONFIG structure. This DMA configuration structure is initialized via DMA_ENABLER_CONFIG_INIT.

Attributes
Specifies the generic object attributes associated with the DMA enabler.
These attributes include context size and the object's destroy callback function.

DmaEnabler
Points to a DMAENABLER which will receive the created DMA enabler handle.

Returned Value:
DmaEnablerCreate returns STATUS_SUCCESS when a new DMA enabler has been successfully created. Some possible failure status values are:
STATUS_INVALID_PARAMETER—An invalid parameter was detected.
STATUS_INSUFFICIENT_RESOURCES—There was not enough memory to construct a new DMA enabler.

Comments:
This function is called at IRQL=PASSIVE_LEVEL.
Prior to calling DmaEnablerCreate, the device manager sets its alignment requirement via the DeviceSetAlignmentRequirement function.

See Also:
ObjectReference, ObjectSetDestroyCallback, DmaEnablerDelete
DMA_ENABLER_CONFIG_INIT

```
VOID
DMA_ENABLER_CONFIG_INIT
(
    IN DMA_ENABLER_CONFIG   * DmaConfig,
    IN DMA_PROFILE          Profile,
    IN size_t               MaximumLength
);
```

DMA_ENABLER_CONFIG_INIT initializes the DMA enabler configuration structure for subsequent use by DmaEnablerCreate.

Parameters:
Profile
Specifies the DMA operations profile the DMA enabler will be configured to support.

```
typedef enum _DMA_PROFILE
{
    DmaProfilePacket = 0,
    DmaProfileScatterGather,
    DmaProfilePacket64,
    DmaProfileScatterGather64,
    DmaProfileScatterGatherDuplex,
    DmaProfileScatterGather64Duplex,
} DMA_PROFILE;
```

Note: Some duplex-type profiles, such as DmaProfilePacketDuplex or DmaProfilePacket64Duplex, are not supported for packet mode operations.

MaximumLength
Specifies the maximum DMA transfer, in bytes, that can be handled in a single DMA operation. Good-citizen values should be less than 65536 (0x10000). This good-citizen value is based on the current upper limit of 16 map registers imposed by current HALs (Hardware Abstraction Layers).

Note: On some OS levels, the recommended limit of 16 map register may be relaxed. But if the drive is to target multiple OS levels, then this value may need to be restricted to the proposed value cited above.

Returned Value:
None

Comments:
This function is called at IRQL=PASSIVE_LEVEL.

Prior to calling DmaEnablerCreate, the device manager sets its alignment requirement via the DeviceSetAlignmentRequirement.

See Also:
ObjectReference, ObjectSetDestroyCallback, DmaEnablerDelete
DmaEnablerGetMaximumLength

```
size_t
DmaEnablerGetMaximumLength
(
    IN DMAENABLER DmaEnabler
);
```

DmaEnablerGetMaximumLength gets the current MaximumLength setting in the referenced DMA enabler.

Parameters:
DmaEnabler
The DmaEnabler handle which was returned from a successful DmaEnablerCreate. This function does not affect the state of the DMA enabler.

Returned Value:
The returned value is the maximum length of a DMA transfer in bytes. This value is the same as the maximum length specified in the DmaEnablerCreate function call.

Comments:
This function may be called at IRQL<=DISPATCH_LEVEL.

DmaEnablerSetMaximumScatterGatherElements

```
VOID
DmaEnablerSetMaximumScatterGatherElements
(
    IN DMAENABLER    DmaEnabler
    IN size_t        MaximumElements
);
```

DmaEnablerSetMaximumScatterGatherElements sets the maximum number of SCATTER_GATHER_ELEMENTS which the device manager supports.

Parameters:
DmaEnabler
The DmaEnabler handle returned from a successful DmaEnablerCreate.
MaximumElements
MaximumElements is the maximum number of scatter/gather elements which the device manager supports. This function is optional, and if not called, then the DMA enabler implicitly uses a default value of DMA_ENABLER_UNLIMITED_FRAGMENTS to indicate no limitation.

Returned Value:
None

Comments:
This function is called at IRQL=PASSIVE_LEVEL.

The DmaEnablerSetMaximumScatterGatherElements function is used during device initialization after a successful call to DmaEnablerCreate.

See Also:
DmaEnablerCreate, DmaEnablerGetMaximumScatterGatherElements
DmaEnablerGetMaximumScatterGatherElements

```
size_t
DmaEnablerGetMaximumScatterGatherElements
(
    IN DMAENABLER DmaEnabler
);
```

DmaEnablerGetMaximumScatterGatherElements gets the maximum number of SCATTER_GATHER_ELEMENTS which the device manager supports.

Parameters:
DmaEnabler
The DmaEnabler handle returned from a successful DmaEnablerCreate.

Returned Value:
The returned value is the maximum number of scatter/gather elements which the device manager supports. The default "unlimited" value is indicated by a value of DMA_ENABLER_UNLIMITED_FRAGMENTS.

Comments:
This function may be called at IRQL<=DISPATCH_LEVEL.

See Also:
DmaEnablerCreate, DmaEnablerSetMaximumScatterGatherElements
DmaTransactionCreate

```
STATUS
DmaTransactionCreate
(
    IN DMAENABLER         DmaEnabler,
    IN OBJECT_ATTRIBUTES  * Attributes OPTIONAL,
    OUT DMATRANSACTION    * DmaTransactionHandle
)
```

DmaTransactionCreate creates a new DMA transaction instance. The returned DMA transaction is initialized with DmaTransactionInitialize[UsingRequest] before it is executed via DmaTransactionExecute. The separation of the create action from the initialize action allows the device manager developer to reserve DMA Request objects for low-resource conditions.

Parameters:
DmaEnabler
The DMAENABLER handle returned from a successful DmaEnablerCreate.
Attributes
Specifies the generic object attributes associated with the DMA transaction. These attributes include context size and the object's destroy callback function.
DmaTransactionHandle
This is the returned DMA transaction handle which will be used for this life of this DMA Request. It represents this unique DMA transaction. When this DMA transaction is complete, ObjectDelete or DmaTransactionRelease is called.

Returned Value:
DmaTransactionCreate returns STATUS_SUCCESS when a new DMA transaction object is successfully created. Possible failure return status values are:
STATUS_INVALID_PARAMETER—An invalid parameter was detected.
STATUS_INSUFFICIENT_RESOURCES—There was not enough memory to construct a new DMA transaction instance.
Comments:
This function may be called at IRQL==PASSIVE_LEVEL.
See Also:
DmaTransactionExecute, ObjectDelete, DmaTransactionDmaCompleted, DmaTransactionRelease
DmaTransactionInitializeUsingRequest

```
STATUS
DmaTransactionInitializeUsingRequest
(
    IN DMATRANSACTION     DmaTransaction,
    IN REQUEST            Request,
    IN PFN_PROGRAM_DMA    EvtProgramDmaFunction,
    IN DMA_DIRECTION      DmaDirection
)
```

DmaTransactionInitializeUsingRequest initializes (or reinitializes) a DMA transaction instance. This function does not start a DMA operation. Rather it captures the Request parameters in the DMA transaction instance. A subsequent call to DmaTransactionExecute initiates the first (and perhaps only) DMA transfer for this DMA transaction.
DmaTransactionInitializeUsingRequest is typically called from a device manager's input/output Dispatch routine.
Parameters
DmaTransaction
This is a DMA Transaction handle returned from DmaTransactionCreate.
Request
The Request parameter is the input/output queue Request handle. The Request parameter is normally a parameter on the device manager's Dispatch (IRP_MJ_WRITE, for example) or StartIo routine. This Request is coupled with the DMA Request.
EvtProgramDmaFunction
This is the device-specific function that focuses on device specifics of programming a DMA operation. The prototype for this callback is shown below. If the device manager's ProgramDmaFunction succeeds in starting the DMA operation, the TRUE is returned, otherwise FALSE.

```
typedef BOOLEAN (*PFN_PPROGRAM_DMA)
(
    IN DEVICE             Device,
    IN PVOID              Context,
    IN DMA_DIRECTION      Direction,
    IN PSCATTER_GATHER_LIST  SgList
);
```

DmaDirection
DmaDirection is an enumeration with two values, representing the two possible directions of the DMA transfer.

```
typedef enum _DMA_DIRECTION
{
    DmaDirectionReadFromDevice = FALSE,
    DmaDirectionWriteToDevice = TRUE,
} DMA_DIRECTION;
```

Returned Value:
DmaTransactionInitializeUsingRequest returns STATUS_SUCCESS when a DMA transaction instance is successfully initialized. Possible failure return status values are:
STATUS_INVALID_PARAMETER—An invalid parameter was detected.
STATUS_INVALID_DEVICE_REQUEST—The input/output queue Request contains an invalid MDL.
Comments:
This function may be called at IRQL<=DISPATCH_LEVEL.
See Also:
DmaTransactionCreate, DmaTransactionExecute, ObjectDelete, DmaTransactionDmaCompleted
DmaTransactionInitialize

```
STATUS
DmaTransactionInitialize
(
    IN DMATRANSACTION     DmaTransaction,
    IN PFN_PROGRAM_DMA    EvtProgramDmaFunction,
    IN DMA_DIRECTION      DmaDirection,
    IN PMDL               Mdl,
    IN PVOID              Offset,
    IN size_t             Length
)
```

DmaTransactionInitialize initializes (or reinitializes) a DMA transaction from direct, lower-level parameters. It may be used when the device manager wishes to perform a DMA operation but does not have a Request instance. This contrasts with DmaTransactionInitializeUsingRequest which internally extracts similar parameters from the Request.
Parameters:
DmaTransaction
This is the DMA transaction handle returned from DmaTransactionCreate.
EvtProgramDmaFunction
This function focuses on device specifics of programming a DMA operation. The prototype for this callback is shown below. If the device manager's ProgramDmaFunction succeeds in starting a DMA operation, then TRUE is returned, otherwise FALSE.

```
typedef BOOLEAN (*PFN_PPROGRAM_DMA)
(
    IN PVOID              Context,
    IN DMA_DIRECTION      Direction,
    IN PSCATTER_GATHER_LIST  SgList
);
```

DmaDirection
DmaDirection is an enumeration with two values, representing the two possible directions of the DMA transfer.

```
typedef enum _DMA_DIRECTION
{
    DmaDirectionReadFromDevice = FALSE,
    DmaDirectionWriteToDevice = TRUE,
} DMA_DIRECTION;
```

Mdl

This is a pointer to a filled, in MDL structure.

Offset

This is an offset to where the DMA transaction is to begin DMA operations. Typically it is the top of the buffer to be transferred, although it may be adjusted to any valid offset within that buffer.

Length

This is the length of the buffer to be transferred. This should be adjusted if an Offset other than the starting offset is specified.

Returned Value:

DmaTransactionInitialize returns STATUS_SUCCESS when a new DMA transaction is successfully initialized. A possible failure return status value is:

STATUS_INVALID_PARAMETER—An invalid parameter was detected.

Comments:

This function may be called at IRQL<=DISPATCH_LEVEL.

See Also:

DmaTransactionCreate, DmaTransactionExecute, ObjectDelete, DmaTransactionDmaCompleted DmaTransactionExecute

```
STATUS
DmaTransactionExecute
(
    IN DMATRANSACTION    DmaTransaction,
    IN PVOID             Context
)
```

DmaTransactionExecute executes a DMA transaction. This function stages the setup for the first DMA operation and calls the device manager's PFN_PROGRAM_DMA function. Typically this function is called from within the device manager's Dispatch routine after creating and initializing the DMA transaction.

Because DmaTransactionExecute initiates DMA transaction processing, there should be only one call to DmaTransactionExecute per DMA transaction instance. Subsequent calls to DmaTransactionExecute would fail but would not abort the DMA transaction.

Parameters:

DmaTransaction

DmaTransaction is the handle returned from DmaTransactionCreate and identifies the specific DMA transaction to be processed.

Context

This is the device manager's determined values which are presented as the Context when the device manager's PFN_PROGRAM_DMA callback is executed.

Returned Value:

DmaTransactionExecute returns STATUS_SUCCESS when the DMA transaction is successfully initiated. Possible failure return values are:

STATUS_INVALID_PARAMETER—An invalid parameter was detected.

STATUS_INVALID_DEVICE_REQUEST—A subsequent (non-initial) call was made to DmaTransactionExecute.

Comments:

This function can be called at IRQL<=DISPATCH_LEVEL.

If the caller supplies a Context value of a pointer type, then the area to which it is pointing should be available within the PFN_PROGRAM_DMA context (which will be at DISPATCH_LEVEL IRQL.) If possible, it is good to use an object context, as this satisfies these preconditions.

See Also:

DmaTransactionCreate, ObjectDelete, DmaTransactionDmaCompleted

DmaTransactionRelease

```
STATUS
DmaTransactionRelease
(
    IN DMATRANSACTION    DmaTransaction
)
```

DmaTransactionRelease terminates a DMA transaction but does not delete the DMA transaction instance. Upon completion of this function call, all transfer buffers are flushed and all DmaEnabler resources acquired for this transaction are released.

Parameters:

DmaTransaction

DmaTransaction is the handle returned from DmaTransactionCreate and identifies the specific DMA transaction to be processed.

Returned Value:

DmaTransactionRelease returns STATUS_SUCCESS when the DMA transaction has been successfully released. A possible failure return status is:

STATUS_INVALID_PARAMETER—An invalid parameter was detected.

Comments:

This function may be called at IRQL<=DISPATCH_LEVEL.

See Also:

DmaTransactionCreate, DmaTransactionExecute, DmaTransactionDmaCompleted

DmaTransactionDmaCompleted

```
BOOLEAN
DmaTransactionDmaCompleted
(
    IN DMATRANSACTION    DmaTransaction,
    OUT STATUS           * Status
)
```

DmaTransactionDmaCompleted notifies a DMA transaction object that the DMA transfer operation (started via the device manager's PFN_PROGRAM_DMA function) is complete. DmaTransactionDmaCompleted is typically called from the device manager's DPC routine in response to detecting the completion of a DMA transfer operation. The call to DmaTransactionDmaCompleted allows the DMA transaction object to continue processing.

The returned Boolean indicates whether the DMA transaction requires more processing (TRUE). FALSE does not mean that the data were successfully transferred; the updated Status parameter indicates if the DMA transaction was successful. In any case, there will be no further DMA transfers for this DMA transaction.

Parameters:
DmaTransaction
DmaTransaction is the handle returned from DmaTransactionCreate and identifies the specific DMA transaction to be processed.
Status
A pointer to a STATUS. STATUS is updated with the DmaTransactionDmaCompleted status (see comments below).

Returned Value:
If the DMA transaction needs to do more DMA transfers in order to complete the DMA transaction, then TRUE is returned and Status is set to STATUS_MORE_PROCESSING_REQUIRED.
A return value of FALSE indicates that the DMA transaction transitioned from the TRANSFER state to the TRANSFER_COMPLETED state. Status indicates whether the data were transferred successfully (STATUS_SUCCESS).

Comments:
This function may be called at IRQL==DISPATCH_LEVEL.
It is the device manager's responsibility to determine which DMA transaction has completed.
The updated status value falls into one of three categories:
STATUS_SUCCESS—The transfer is successful. The device manager should complete the input/output queue Request.
STATUS_MORE_PROCESSING_REQUIRED—The transaction contains more DMA operations, and the next DMA operation has been scheduled to the device manager's PFN_PROGRAM_DMA callback function. For simple device managers, a typically response to this status may be to clear the interrupt and return from the DPC routine. Subsequent interrupts and calls to DmaTransactionDmaComplete will eventually signal the completion of the DMA transaction.
STATUS_<errorcode>—This represents an error condition in the transaction. The device manager should call DmaTransactionDelete and then RequestCompleteEx to complete the input/output queue Request with the returned status.

See Also:
DmaTransactionCreate, DmaTransactionExecute, DmaTransactionDelete
DmaTransactionDmaCompletedWithLength

```
BOOLEAN
DmaTransactionDmaCompletedWithLength
(
    IN DMATRANSACTION    DmaTransaction,
    IN size_t            TransferredLength,
    OUT STATUS           * Status
)
```

DmaTransactionDmaCompletedWithLength notifies a DMA transaction that the DMA operation (started in the device manager's PFN_PROGRAM_DMA function) is complete and that the device has provided the DMA transfer length (byte count).
DmaTransactionDmaCompletedWithLength is typically called from the device manager's DPC routine in response to detecting the completion of a DMA transfer operation. The call to DmaTransactionDmaCompletedWithLength allows the DMA transaction object to continue processing.

The returned Boolean indicates whether the DMA transaction requires more processing (TRUE). FALSE does not mean that the data were successfully transferred; the updated Status parameter indicates if the DMA transaction was successful. In any case, there will be no further DMA transfers for this DMA transaction Parameters:
DmaTransaction
DmaTransaction is the handle returned from DmaTransactionCreate and identifies the specific DMA transaction to be processed.
TransferredLength
The device-provided DMA transfer length (i.e., the byte count).
Status
A pointer to a STATUS. STATUS is updated with the DmaTransactionDmaCompletedWithLength status (see comments below).

Returned Value:
If the DMA transaction needs to do more DMA transfers, then TRUE is returned, and Status is set to STATUS_MORE_PROCESSING_REQUIRED.
A return value of FALSE indicates that the DMA transaction has transitioned from the TRANSFER state to the TRANSFER_COMPLETED state. Status indicates whether the data were transferred successfully (STATUS_SUCCESS).

Comments:
This function may be called at IRQL=DISPATCH_LEVEL.
It is the device manager's responsibility to determine which DMA transaction has completed.
The updated status value falls into one of three categories:
STATUS_SUCCESS—The transfer is successful. The device manager should complete the Request.
STATUS_MORE_PROCESSING_REQUIRED—The transaction contains more DMA operations, and the next DMA operation has been scheduled to the device manager's PFN_PROGRAM_DMA callback function. For simple device managers, a typically response to this status may be to clear the interrupt and return from the DPC routine. Subsequent interrupts and calls to DmaTransactionDmaComplete will eventually signal the completion of the DMA transaction.
STATUS_<errorcode>—This represents an error condition in the transaction. The device manager should call ObjectDelete and then RequestCompleteEx to complete the input/output queue Request with the returned status.

See Also:
DmaTransactionCreate, DmaTransactionExecute, ObjectDelete
DmaTransactionDmaCompletedFinal

```
BOOLEAN
DmaTransactionDmaCompletedFinal
(
    IN DMATRANSACTION    DmaTransaction
    IN size_t            FinalTransferredLength,
    OUT STATUS           * Status
)
```

DmaTransactionDmaCompletedFinal notifies a DMA transaction that the DMA operation started in the device manager's PFN_PROGRAM_DMA function is complete and that the device provided the DMA transferred length (byte count).

DmaTransactionDmaCompletedFinal is typically called from the device manager's DPC routine in response to detecting the completion of a DMA operation. It allows the DMA transaction object to continue processing the DMA transaction. This function causes the DMA transaction to transition from the TRANSFER state to TRANSFER_COMPLETED.

Parameters:
DmaTransaction
DmaTransaction is the handle returned from DmaTransactionCreate and identifies the specific DMA transaction to be processed.
FinalTransferredLength
The device-provided DMA transfer length (i.e., byte count).
Status
A pointer to a STATUS. STATUS is updated with the DmaTransactionDmaCompletedFinal status (see comments below).

Returned Value:
FALSE is always returned indicating that there will be no further DMA transfers.

Comments:
This function can be called at IRQL==DISPATCH_LEVEL.
The FALSE return value (always returned) facilitates common-status-processing code patterns involving the function is DmaTransactionDmaCompletedWithLength and DmaTransactionDmaCompletedFinal.

See Also:
DmaTransactionCreate, DmaTransactionExecute, ObjectDelete
DmaTransactionSetMaximumLength

```
VOID
DmaTransactionSetMaximumLength
(
    IN DMATRANSACTION    DmaTransaction
    IN size_t            MaximumLength
)
```

DmaTransactionSetMaximumLength overrides the default MaximumLength value only for only this one DMA transaction instance. The DMA transaction instance was created with a default value derived from the DMA enabler. The effective DMA transaction MaximumLength is MIN(DMA enabler's MaximumLength, MaximumLength).

Parameters:
DmaTransaction
DmaTransaction is the handle returned from DmaTransactionCreate and identifies the specific DMA transaction to be processed.
MaximumLength
MaximumLength should be less than or equal to the DMA enabler's MaximumLength value.
Note: This is a Set property function, that is, no status is returned if this parameter is greater than the default value.

Returned Value:
None

Comments:
This function may be called at IRQL<=DISPATCH_LEVEL.

See Also:
DmaTransactionCreate, DmaTransactionInitialize, DmaTransactionInitializeUsingRequest, DmaTransactionExecute, ObjectDelete
DmaTransactionGetBytesTransferred

```
size_t
DmaTransactionGetBytesTransferred
(
    IN DMATRANSACTION    DmaTransaction
)
```

DmaTransactionGetBytesTransferred is called to get the number of bytes transferred by this DMA transaction. This function is typically used to get the final transferred byte count to be returned in the RequestCompleteEx function call.

Parameters:
DmaTransaction
DmaTransaction is the handle returned from DmaTransactionCreate and identifies the specific DMA transaction to be processed.

Returned Value:
The current number of bytes transferred by this DMA transaction.

Comments:
This function may be called at IRQL<=DISPATCH_LEVEL.

See Also:
DmaTransactionCreate, DmaTransactionExecute, ObjectDelete
DmaTransactionGetRequest

```
REQUEST
DmaTransactionGetRequest
(
    IN DMATRANSACTION    DmaTransaction
)
```

DmaTransactionGetRequest is called to get the REQUEST handle associated with the specified DMA transaction.

Parameters:
DmaTransaction
A DmaTransaction handle returned from DmaTransactionCreate.

Returned Value:
The handle to the associated REQUEST Request for this DMA Transaction. This is the Request parameter value of the DmaTransactionIntializeUsingRequest function.
A NULL return indicates an, error condition or that the DMA transaction was created via DmaTransactionInitialize, which does not associate the DMA transaction with a REQUEST handle.

Comments:
This function should be used with DmaTransactionInitializeUsingRequest, not with DmaTransactionInitialize.
This function may be called at IRQL<=DISPATCH_LEVEL.

See Also:
DmaTransactionCreate, DmaTransactionInitializeUsingRequest
DmaTransactionGetCurrentDmaTransferLength

```
size_t
DmaTransactionGetCurrentDmaTransferLength
(
    IN DMATRANSACTION      DmaTransaction
)
```

DmaTransactionGetCurrentDmaTransferLength gets the current DMA transfer size. This function is typically called from the device manager's DPC routine.

Parameters:
DmaTransaction
   The DmaTransaction handle returned from DmaTransactionCreate.

Returned Value:
   The length of the current DMA transfer. If this function is called while the DMA transaction in progress (that is, its state is TRANSFER), then the return value is the actual number of bytes successfully transferred at that time. If called after the state transition to TRANSFER_COMPLETED with a successful status, then the return value is the final transferred byte count.

Comments:
   This function is typically used for devices which report residual transfer lengths (that is, the byte count for yet-to-be-transferred data). By subtracting the value returned by DmaTransactionGetCurrentDmaTransferLength from the device-reported residual byte count, the actual transfer length is derived. This could then be reported via DmaTransactionDmaCompletedWithLength.
   This function may be called at IRQL<=DISPATCH_LEVEL.

See Also:
   DmaTransactionCreate, DmaTransactionDmaCompletedWithLength
   DmaTransactionGetDevice

```
DEVICE
DmaTransactionGetDevice
(
    IN DMATRANSACTION      DmaTransaction
)
```

DmaTransactionGetDevice is called to get the DEVICE handle associated with the specified DMA transaction.

Parameters:
DmaTransaction
   The DmaTransaction handle returned from DmaTransactionCreate.

Returned Value:
   The handle to the associated Device for this DMA transaction. This is the Device parameter value of DmaTransactionCreate.

Comments:
   This function may be called at IRQL<=DISPATCH_LEVEL.

See Also:
   DmaTransactionCreate
   CommonBufferCreate

```
STATUS
CommonBufferCreate
(
    IN DMAENABLER          DmaEnabler,
    IN size_t              Length,
    IN POBJECT_ATTRIBUTES  Attributes OPTIONAL,
    OUT COMMONBUFFER       * CommonBuffer
)
```

CommonBufferCreate allocates memory and maps it so that it is simultaneously accessible from both the processor and from a device for DMA operations. The returned COMMONBUFFER handle is used on subsequent CommonBuffer API calls, such as CommonBufferGetAlignedVirtualAddress, to reference this CommonBuffer object.

Parameters:
DmaEnabler
   A DMA enabler handle returned from a successful DmaEnablerCreate.

Length
   This is the size of the allocated memory in bytes.

Attributes
   Specifies the generic object attributes associated with the CommonBuffer object. These attributes include context size and the object's destroy callback function. It may be NULL if no context area is desired.

CommonBufferHandle
   This is a pointer to a COMMONBUFFER variable which receives the new CommonBuffer object's handle.

Returned Value:
   CommonBufferCreate returns STATUS_SUCCESS to indicate that the requested common buffer memory has been allocated.

Comments:
   This function must be called at IRQL=PASSIVE_LEVEL.
   The device manager sets its alignment requirement, via the function DeviceSetAlignmentRequirement, prior to calling this function. This is typically done in the AddDevice or StartDevice routines when the device is initialized.
   Note: There is no cache option for this function as in AllocateCommonBuffer. This is because all platforms implement cache flushing per the x86 HAL model. In other words, the buffers are allocated as cached by the HAL; the AllocateCommonBuffer cache options are effectively ignored.
   Below is a snippet of code which shows the general pattern of COMMONBUFFER objects.

```
//================= Create a Common Buffer ================
DevExt->CommonBufferSize = sizeof(COMMON_BUFFER_STRUCT);
status = CommonBufferCreate(DevExt->DmaEnabler, DevExt->CommonBufferSize,
    NO_ATTRIBUTES, &DevExt->CommonBuffer);
if(status == STATUS_SUCCESS)
{
    DevExt->CommonBufferBaseVA =
```

```
        CommonBufferGetAlignedVirtualAddress(DevExt->CommonBuffer);
    DevExt->CommonBufferBaseLA =
        CommonBufferGetAlignedLogicalAddress(DevExt->CommonBuffer);
}
//================== Destroy a Common Buffer ================
if(DevExt->CommonBuffer)
{
    CommonBufferDelete(DevExt->CommonBuffer);
    DevExt->CommonBuffer = NULL;
}
```

See Also:
  CommonBufferDelete
  CommonBufferGetAlignedVirtualAddress

```
        PVOID
        CommonBufferGetAlignedVirtualAddress
        (
            IN COMMONBUFFER CommonBuffer
        )
```

CommonBufferGetAlignedVirtualAddress returns the aligned virtual address for a CommonBuffer object. The device manager does not need to adjust the virtual address to the CommonBuffer memory itself, but rather allows this function to manage alignment issues.

Parameters:
  CommonBufferHandle
  A COMMONBUFFER handle returned from a successful call to CommonBufferCreate.

Returned Value:
  A virtual address pointer which is properly aligned per the device's alignment requirements and per the platform's alignment requirements.

Comments:
  This function may be called at IRQL<=DISPATCH_LEVEL.

See Also:
  CommonBufferCreate, CommonBufferGetAlignedLogicalAddress
  CommonBufferGetAlignedLogicalAddress

```
        PHYSICAL_ADDRESS
        CommonBufferGetAlignedLogicalAddress
        (
            IN COMMONBUFFER CommonBuffer
        )
```

CommonBufferGetAlignedLogicalAddress returns the aligned logical address for a CommonBuffer object. The device manager does not need to adjust the logical address to the CommonBuffer memory itself, but rather allows this function to manage alignment issues.

Parameters:
  CommonBufferHandle
  A COMMONBUFFER handle returned from a successful call to CommonBufferCreate.

Returned Value:
  A PHYSICAL_ADDRESS value which is properly aligned per the device's alignment requirement and per the platform's alignment requirements.

Comments:
  This function may be called at IRQL<=DISPATCH_LEVEL.

See Also:
  CommonBufferCreate, ComnmonBufferGetAlignedVirtualAddress
  CommonBufferGetLength

```
        size_t
        CommonBufferGetLength
        (
            IN COMMONBUFFER CommonBuffer
        )
```

CommonBufferGetLength returns the length of the buffer associated with the CommonBuffer object. This is the same length specified for the creation of the CommonBuffer object.

Parameters:
  CommonBufferHandle
  A COMMONBUFFER handle returned from a successful call to CommonBufferCreate.

Returned Value:
  The length value used to create the CommonBuffer object.

Comments:
  This function may be called at IRQL<=DISPATCH_LEVEL.

See Also:
  CommonBufferCreate

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as the details of the APIs, are determined by specific situations. Although the environment of the invention is described in terms of software modules or components, some processes may be equivalently performed by hardware components. Therefore, the invention as described herein contemplates all such embodiments as may come within the scope of the following claims and equivalents thereof.

I claim:
1. In a computing environment, a method for structuring at least a first direct memory access (DMA) transaction, the method comprising:
   creating an instance of a DMA enabler object for a device, the DMA enabler object being a first one of a plurality of object-oriented programming constructs, the instance of the DMA enabler object comprising computer-executable instructions for controlling DMA operations indicated to be supported for the device;

initializing data in the instance of the DMA enabler object, the data specifying a profile of the device, the specified profile indicating DMA features supported by the device, the indicated DMA features supported by the device comprising at least one of whether scatter/gather DMA operations are supported, a type of addressing supported, and whether duplex operations are supported;

creating a first instance of a DMA transaction object having computer-executable instructions for processing a first DMA transaction with respect to the device, the DMA transaction object being a second one of the plurality of object-oriented programming constructs;

initializing first data in the instance of a DMA transaction object, the instance of the DMA transaction object referencing the instance of the DMA enabler object after the initializing first data in the instance of the DMA transaction object;

processing the first DMA transaction to completion in conjunction with transitioning the first instance of the DMA transaction object through processing states, wherein the method is implemented by a computer system.

2. The method of claim 1, wherein the method implements a device manager.

3. The method of claim 2 wherein the device manager is a kernel-mode device driver.

4. The method of claim 1 wherein:
the creating a first instance of the DMA transaction object comprises referencing the instance of the DMA enabler object, the instance of the DMA enabler object including a container for a DMA adapter object with respect to the device.

5. The method of claim 1 wherein the initializing data in the first instance of the DMA transaction object comprises placing one or more calls through an interface with respect to the first instance of the DMA transaction object specifying a direction of the first DMA transaction, specifying an offset into a buffer containing data to be transferred for the first DMA transaction, and specifying a length of data in the buffer to be transferred for the first DMA transaction.

6. The method of claim 1 wherein the transitioning the first instance of the DMA transaction object comprises calling a programming interface with respect to the first instance of the DMA transaction object.

7. The method of claim 6 wherein the calling a programming interface with respect to the first instance of the DMA transaction object comprises calling a programming interface from the set comprised of:
a DMA Transaction Execute programming interface which initiates processing of the first DMA transaction,
a DMA Transaction DMA Completed programming interface which notifies the first instance of the DMA transaction object that the first DMA transaction is complete, and
a DMA Transaction Get Bytes Transferred programming interface which returns an indication of an amount of data transferred by the first DMA transaction.

8. The method of claim 1 further comprising: receiving an input/output request for the first DMA transaction from an operating system.

9. The method of claim 1 wherein:
the creating an instance of a DMA enabler object is performed prior to the creating a first instance of a DMA transaction object, the instance of the DMA enabler object including a container for a DMA adapter object with respect to the device; and the method further comprises initializing data in the instance of the DMA enabler object.

10. The method of claim 9 wherein the initializing data in the instance of the DMA enabler object comprises selecting a profile from a set of profiles for the first DMA transaction, the selected profile specifying general operating parameters for the first DMA transaction.

11. The method of claim 10 wherein the selecting a profile for the first DMA transaction comprises selecting a profile from the set of profiles comprised of:
a "DMA Profile Packet 32" profile for devices which support 32-bit addressing,
a "DMA Profile Scatter Gather 32" profile for devices which support 32-bit addressing and scatter/gather DMA operations,
a "DMA Profile Packet 64" profile for devices which support 64-bit addressing,
a "DMA Profile Scatter Gather 64" profile for devices which support 64-bit addressing and scatter/gather DMA operations,
a "DMA Profile Scatter Gather 32 Duplex" profile for devices which support 32-bit addressing, scatter/gather DMA operations and duplex DMA operations, and
a "DMA Profile Scatter Gather 64 Duplex" profile for devices which support 64-bit addressing, scatter/gather DMA operations and duplex DMA operations.

12. The method of claim 9 wherein the initializing data in the instance of the DMA enabler object comprises initializing data specifying:
the device supporting the first DMA transaction, a maximum length of a DMA transaction supported by the device, and a maximum number of scatter/gather elements supported by the device.

13. The method of claim 1 further comprising: providing status of the first DMA transaction, the status comprising an amount of data transferred in the first DMA transaction.

14. The method of claim 1 further comprising:
deleting the first instance of the DMA transaction object.

15. The method of claim 1 wherein a second DMA transaction is structured, and wherein structuring the second DMA transaction comprises:
re-initializing data in the first instance of the DMA transaction object; and
processing the second DMA transaction to completion in conjunction with transitioning the first instance of the DMA transaction object through processing states.

16. The method of claim 1 wherein a second DMA transaction is structured, and wherein structuring the second DMA transaction comprises:
creating a second instance of the DMA transaction object;
initializing data in the second instance of the DMA transaction object; and
processing the second DMA transaction to completion in conjunction with transitioning the second instance of the DMA transaction object through processing states.

17. A computer-readable storage medium having computer-executable instructions for performing a method for structuring at least a first direct memory access (DMA) transaction, the method comprising:
creating an instance of a DMA enabler object storing operational parameters supported by a device and comprising computer-executable instructions for controlling DMA operations for the device, the instance of the DMA enabler object including a container for a DMA adapter object with respect to the device;
initializing data in the instance of the DMA enabler object, the data specifying a profile of the device, the specified profile indicating DMA features supported by the device, the indicated DMA features supported by the device comprising at least one of whether scatter/gather DMA operations are supported, a type of addressing supported, and whether duplex operations are supported;

in response to an input/output request involving the device, creating a first instance of a DMA transaction object having computer-executable instructions for processing the first DMA transaction with respect to the device, the creating a first instance of a DMA transaction object comprising referencing the instance of the DMA enabler object from the first instance of the DMA transaction object, the instance of the DMA enabler object storing operational parameters supported by the device to perform the first DMA transaction;

initializing first data in the first instance of the DMA transaction object; and processing the first DMA transaction to completion in conjunction with transitioning the instance of the first DMA transaction object through processing states, wherein:

the DMA enabler object and the DMA transaction object are object-oriented programming constructs, and the first instance of the DMA transaction object maintains state and status information during the processing of the first DMA transaction with respect to the device.

18. The computer-readable storage medium of claim 17, wherein the first instance of the DMA transaction object references the instance of the DMA enabler object via a handle of the instance of the DMA enabler object.

19. A system for structuring at least a first direct memory access (DMA) transaction in a computing environment, the system comprising:

an operating system configured for sending an input/output request for the first DMA transaction to a device manager; and a device manager configured for:

creating an instance of a DMA enabler object for a device, the DMA enabler object being a first one of a plurality of object-oriented programming constructs, the instance of the DMA enabler object comprising computer-executable instructions for controlling DMA operations indicated as being supported by the device, initializing data in the instance of the DMA enabler object, the data specifying a profile of the device, the specified profile indicating DMA features supported by the device, the indicated DMA features supported by the device comprising at least one of whether scatter/gather DMA operations are supported, a type of addressing supported, and whether duplex operations are supported, receiving the input/output request, for creating a first instance of a DMA transaction object that maintains a processing state of the first DMA transaction with respect to the device, for initializing first data in the first instance of the DMA transaction object, the first instance of the DMA transaction object referencing the instance of the DMA enabler object after the initializing of the data in the first instance of the DMA transaction object, and processing the first DMA transaction to completion in conjunction with transitioning the first instance of the DMA transaction object through processing states; and a processor to execute a plurality of software modules, the plurality of software modules comprising the operating system, wherein:

the first instance of the DMA transaction object is in a first state after the initializing and before starting the processing, is in a second state during processing, and transitions to a third state after completion of processing, wherein the DMA transaction object is a second one of the plurality of object-oriented programming constructs.

20. The system of claim 19 wherein the device manager is a kernel-mode device driver.

21. The system of claim 19:

wherein:

the device manager is further configured for creating the instance of the DMA enabler object prior to the creating of the first instance of the DMA transaction object.

22. The system of claim 19 further comprising:

a second instance of the DMA transaction object; wherein the device manager is further configured for initializing data in the second instance of the DMA transaction object and for processing a second DMA transaction to completion in conjunction with transitioning the second instance of the DMA transaction object through processing states.

23. In a computing environment, a method for preparing the computing environment for structuring a direct memory access (DMA) transaction, the method comprising:

employing a processor executing computer-executable code stored in a memory to implement the following acts using object-oriented programming constructs including a DMA enabler object and a DMA transaction object:

creating an instance of the DMA enabler object for a device, the instance of the DMA enabler object including a container for a DMA adapter object with respect to the device;

initializing data in the instance of the DMA enabler object, the data specifying a profile from a profile pool, the specified profile indicating DMA features supported by the device, the indicated DMA features supported by the device comprising at least one of whether scatter/gather DMA operations are supported, a type of addressing supported, and whether duplex operations are supported;

creating a first instance of the DMA transaction object for maintaining state and status information of a first DMA transaction with respect to the device, the first instance of the DMA transaction object having computer-executable instructions for processing a first DMA transaction with respect to the device; and initializing first data in the first instance of the DMA transaction object, the first instance of the DMA transaction object referencing the instance of the DMA enabler object after the initializing first data in the instance of the DMA transaction object.

24. The method of claim 23 wherein the method runs in a device manager.

25. The method of claim 24 wherein the device manager is a kernel-mode device driver.

26. The method of claim 23 wherein the profile is selected from among the set of profiles comprised of:

a "DMA Profile Packet 32" profile for devices which support 32-bit addressing, a "DMA Profile Scatter Gather 32" profile for devices which support 32-bit addressing and scatter/gather DMA operations, a "DMA Profile Packet 64" profile for devices which support 64-bit addressing, a "DMA Profile Scatter Gather 64" profile for devices which support 64-bit addressing and scatter/gather DMA operations, a "DMA Profile Scatter Gather 32 Duplex" profile for devices which support 32-bit addressing, scatter/gather DMA operations and duplex DMA operations, and a "DMA Profile Scatter Gather 64 Duplex" profile for devices which support 64-bit addressing, scatter/gather DMA operations and duplex DMA operations.

27. The method of claim 23 wherein initializing data in the instance of the DMA enabler object further comprises initializing data specifying:

the device supporting the DMA transaction, a maximum length of a DMA transaction supported by the device, and a maximum number of scatter/gather elements supported by the device.

28. A computer-readable storage medium having computer-executable instructions for performing a method for preparing a computing environment for structuring a direct memory access (DMA) transaction, the method comprising:

creating an instance of a DMA enabler object for a device, the instance of the DMA enabler object including a container for a DMA adapter object with respect to the device, the DMA enabler object being a first one of a plurality of object-oriented programming constructs, the instance of the DMA enabler object comprising computer-executable instructions for controlling DMA operations indicated to be supported for the device; and initializing data in the instance of the DMA enabler object, the data specifying a profile of the device, the specified profile indicating DMA features supported by the device, the indicated DMA features supported by the device comprising at least one of whether scatter/gather DMA operations are supported, a type of addressing supported, and whether duplex operations are supported; and initializing first data in a previously used instance of a DMA transaction object, the DMA transaction object being a second one of the plurality of object-oriented programming constructs, the instance of the DMA transaction object referencing the instance of the DMA enabler object after the initializing first data in the previously used instance of the DMA transaction object.

* * * * *